United States Patent Office 2,929,733
Patented Mar. 22, 1960

2,929,733

PROCESS FOR THE MANUFACTURE OF HEAT STABILIZING AND PLASTICIZING PASTE COMPOSITIONS

Leonard M. Kebrich, Brooklyn, and Alfred W. Stroebel, Forest Hills, N.Y., assignors to National Lead Company, New York, N.Y., a corporation of New Jersey No Drawing. Application December 16, 1957
Serial No. 702,802

5 Claims. (Cl. 106—243)

This invention relates to a process for the manufacture of flushed pastes having heat stabilizing and plasticizing properties for resinous compositions.

The term "flushed pastes" refers to pigment-vehicle paste compositions prepared by a preferential dispersion process as, for example, mixing or agitating an aqueous filter cake of a solid substance or pigment with an oily vehicle until the solid portions are dispersed in the oil phase and the aqueous phase separated from the pigment-oil paste. Such processes are highly desirable in many industrial applications. Where a flushing operation can be employed, there is an elimination of drying and grinding operations. In the event the solid substances are unstable, e.g. of an inflammable nature, there is substantially complete elimination of the fire hazard. In addition to this, there is a total elimination of the dusting problem. This latter aspect assumes considerable importance where the substances can cause severe irritations or are toxic, as is the case with some lead chemicals.

Another disadvantage involved in the usual practice of drying the filter cake by evaporation to produce a powdered product lay in the fact that any water-soluble salts present in the water-wet filter cake (which was normally about 50% solids—i.e. half water) were concentrated upon evaporation of the water and remained intimately mixed with the stabilizer. These salts thus found their way into the vinyl or other resin to which the stabilizer was added, and resulted in appreciable impairment of the electrical insulating properties of the resin. In some instances, moreover, the retained salts caused severe agglomeration of the solid particles during drying, forming agglomerates which could not be resolved by the finest dry grinding and which impaired subsequent dispersion in liquid media.

Pigment-vehicle flushing processes have long been known to the painting arts, as exemplified by the manufacture of white lead paste in linseed oil. Not all substances, however, lend themselves to flushing processes. In some instances, the solids dispersed in one liquid medium are not preferentially wetted by the desired dispersing medium. In other instances, emulsions are formed by the liquid media which cannot be separated and which prevent the transfer of the solid substances from one liquid phase to the other. Furthermore, it has not heretofore been known that flushing techniques might be employed for the preparation of paste compositions having heat stabilizing and plasticizing properties for resinous compositions.

The principal object of this invention is to provide a novel process for the manufacture of paste compositions having heat stabilizing properties for resinous compositions.

Another object is to provide a process for the manufacture of paste compositions having heat stabilizing and plasticizing properties for resinous compositions.

A further object is to provide a process for the manufacture of flushed pastes employing a novel wetting agent to effect the phase transfer of heat stabilizing substances from an aqueous medium to an organic medium.

Additional objects and advantages will become obvious from the following detailed description of the invention and the appended claims.

According to the process of the invention, an aqueous filter cake of a basic lead salt is mixed or agitated with an organic vehicle, preferably a liquid plasticizer, in the presence of a small amount, preferably about 0.5% to 5%, based on the weight of the organic vehicle, of a fatty acid having 6 to 22 carbon atoms, thereby dispersing said basic lead salt in said organic vehicle, and the water portion of said aqueous filter cake separated from said organic vehicle and said lead salt therein dispersed. As used herein, the term "filter cake" is taken to mean an aqueous paste resulting from filtration or equivalent operations, e.g. centrifugation, settling or the like.

Within the range above noted, the higher proportions of wetting agent will generally be preferred for the flushing of aqueous pastes containing larger amounts of water, and the smaller proportions for relatively dry pastes.

Basic lead salts for use as stabilizers for vinyl resins, for example basic carbonate white lead, dibasic lead phthalate, dibasic lead phosphite and tribasic lead sulfate, are normally manufactured in an aqueous medium. When these salts are concentrated by conventional methods, e.g. filtration or centrifugation, they form a semi-solid cake, which generally contains 50% or more of water in addition to the solid portions therein. The heretofore usual practice has been to dry this filter cake to separate the solid portions, with all of the attendant disadvantages mentioned above, and subsequently incorporate the dried cake into an organic vehicle, such as a plasticizer, or directly into the composition to be stabilized. According to this invention, on the other hand, the plasticizer vehicle may be added directly to the filter cake in a suitable container fitted with mechanical mixing means and the stabilizer flushed directly into said plasticizer (or other vehicle).

The proportion of plasticizer or other vehicle added is not critical, but it should be present in sufficient quantity to permit complete dispersion therein of the solid portion of the filter cake. This amount will generally be a weight of plasticizer that is roughly equivalent to one-fourth of the weight of the solid portion of the filter cake. In addition to the plasticizer, the process requires the presence of a small proportion of a wetting agent or surfactant to promote preferential wetting and dispersion of the solids in the plasticizer phase. It has been observed that the above-mentioned basic lead salts generally are not preferentially wetted by plasticizer vehicles in the absence of such a wetting agent.

The plasticizers that may be employed in this process include all of the ordinary ether- and ester-type plasticizers, but particularly preferred are the esters or polyesters of phthalic acid. Examples of such plasticizers include dicapryl phthalate, diisooctyl phthalate, and di-2-ethylhexyl phthalate. Other useful plasticizers include polyester adipate, polyglycols, triphenyl phosphite, bis(2-ethylhexyl)-2-ethylhexyl phosphonate, etc. While it is preferred that the vehicle be a plasticizer, it is of course possible to employ other organic dispersing media, provided they are not such as to adversely affect the characteristics of the composition with respect to its intended use. Among such other organic vehicles may be mentioned hydrocarbons, such as mineral oil, petroleum jelly and the like.

The wetting agents or surfactants necessary for the successful dispersion of the lead salts into the organic phase are fatty acids having 6 to 22 carbon atoms. The wetting agent should preferably be present in amount about 0.5% to 5% by weight of the organic medium. It has been found that 1% usually approximates an optimum quantity. High proportions of wetting agent, for example amounts in excess of about 5% based on the weight of the organic vehicle, may be employed if desired, but ordinarily are not preferred, as they merely dilute the composition and decrease the content of active materials therein. Typical wetting agents within the class are caproic acid, caprylic acid, lauric acid, capric acid, palmitic acid, stearic acid, undecylic acid and behenic acid. The wetting agents may be added directly to the mixing container or, if desired, they may be added to the plasticizer or other organic medium and introduced into the system therewith. Acids having less than 6, or more than 22 carbon atoms do not function as wetting agents in the practice of this invention, and attempts to use them as such result in a failure of the lead salt to disperse in the organic vehicle.

Within the carbon-chain range above specified, the acids of relatively shorter chain length appear to be the more effective ones. When using these short-chain acids, say from about 6 to 16 carbon atoms, the phase transfer takes place rapidly and without difficulty at room temperature. The effect of the longer chain acids, containing from about 18 to 22 carbon atoms, is less pronounced, and it may be desirable in some cases to assist the transfer by raising the temperature of the charge, for example to about 50–90° C., and/or by adding to the charge a small amount (for example about 2 to 5% by weight of the organic vehicle) of an aliphatic alcohol, such as ethyl, propyl, isopropyl, butyl, isobutyl, hexyl, heptyl or octyl alcohol or the like.

The type of mixing apparatus to be employed in practicing the foregoing process is not critical. Any mixing means which produces a thorough blending action will facilitate the phase transfer of the filter cake solids to the liquid organic vehicle phase. It has been found convenient to employ a vibratory mixing apparatus which vibrates a closed vessel containing the materials to be mixed. Such mixers are commonly employed by paint vendors for mixing paints. In lieu of the vibratory mixer, a Baker-Perkins mixer having a kneading action may be employed. Employing such mechanical mixers, the process of this invention is commonly capable of separating up to 90% and sometimes more of the water originally present in the filter cake. If it is desirable to reduce the moisture content of the plasticizer paste produced in the mechanical mixer, it is a simple matter to couple the mixer with a vacuum apparatus and to gently heat the paste until all but traces of water are driven off.

The time of mixing also is not critical and can be determined from the degree of dispersion of the filter cake solids in the plasticizer phase. With vibrating mixers operating at 200–250 cycles per minute, 15 minutes of mixing will usually produce a complete phase transfer of the solid materials.

The following examples illustrate the practice of the invention:

Example I 57.1 grams of a tribasic lead sulfate filter cake containing 56% water were mixed at room temperature in a vibrating mixer for 15 minutes with 25 grams of di-2-ethylhexyl phthalate and 0.5 gram of caprylic acid surfactant. The phase transfer was substantially complete and 73% of the water contained in the system decanted off at the termination of the mixing operation.

In contrast, a similar system containing no surfactant was emulsified, thereby preventing the dispersion of tribasic lead sulfate into the plasticizer. At the termination of the mixing operation, the batch failed to develop a separated water phase.

Example II 45.4 grams of a dibasic lead phosphite filter cake containing 45% water was placed in a vibrating mixer with 25 grams of di-2-ethyl phthalate and 0.5 gram of caprylic acid and shaken for 15 minutes. At the end of the mixing step, 95.5% of the water originally contained in the system was decanted off the plasticizer paste.

A similar system containing no caprylic acid emulsified during the mixing operation. There was no phase transfer of the filter cake solids and no water could be separated from the other constituents of the system.

Systems similar to the above alternately employing 0.5 gram of the propionic acid, butyric acid, adipic acid, and azelaic acid did not promote a phase transfer of the filter cake solids and did not produce any separation of the aqueous phase of the system.

Example III 2,971 grams of dibasic lead phthalate filter cake containing 46.1% water was placed in a 1-gallon Baker-Perkins mixer with 534 grams of hexyl isodecyl phthalate containing 12.0 grams of caprylic acid. After 15 minutes agitation on the mixer, there was a complete dispersion of the solids in the plasticizer phase and 89% of the water content of the system was decanted off. The balance of the water was removed by dehydrating under vacuum.

A similar system employing dicapryl phthalate as the plasticizer successfully dispersed the dibasic lead phthalate solids in the plasticizer phase in approximately the same mixing time.

Another similar system employing diisooctyl phthalate as the plasticizer dispersed the lead salt solids in the plasticizer phase under the same conditions.

Systems similar to the above but having no surfactant present failed to effect a phase transfer of the solids or to separate any of the aqueous medium.

Example IV 6.00 lb. of tribasic lead sulfate filter cake containing 43.5% water were mixed for 3 hours in a Baker-Perkins mixer with 326 grams of hexyl-isodecyl phthalate (a commercially-available plasticizer of the mixed-ester type), 19.5 grams of commercial behenic acid (containing approximately 85% behenic acid and 15% of 18-carbon acids, principally stearic acid) and 19.5 grams of isobutanol, at a temperature of approximately 80° C. Phase transfer was substantially perfect, resulting in a paste consisting of the tribasic lead sulfate dispersed in the plasticizer, with a solids content of 82.5%, and a clear liquor which was primarily water but also contained substantially all of the isobutanol.

Example V 60 grams of a tribasic lead sulfate filter cake containing 37.5% water were mixed at room temperature in a vibrating mixer for 15 minutes with 20.1 grams of bis (2-ethylhexyl)-2-ethylhexylphosphonate and 0.6 gram caprylic acid surfactant. The phase transfer was substantially complete and 82% of the water contained in the system decanted off at the termination of the mixing operation.

A similar system employing triethylene glycol bicaprylate as the plasticizer successfully dispersed the tribasic lead sulfate solids in the plasticizer phase and 70% of the system's water content was decanted off.

Another similar system utilizing as the plasticizer a polyether and polymeric type plasticizer successfully dispersed the lead salt solids in the plasticizer phase under the same conditions. 84% of the water originally present in the system was decanted off the plasticizer paste.

In systems similar to the above, in which no caprylic acid was added, there was no phase transfer of the filter cake solids and no separate water phase developed.

Example VI 123 grams of dibasic lead phthalate filter cake containing 53.9% water were placed in a vibrating mixer with 20 grams of 1,4-butanedioldipelargonate and 0.4 gram of caprylic acid and shaken for 15 minutes. At the end of this operation, 93.3% of the water originally contained in the system was decanted off the plasticizer paste. Using n-octylepoxystearate as the plasticizer, in a system similar to the above, resulted in the complete dispersion of the dibasic lead phthalate solids in the plasticizer phase.

Another similar system employing tricresylphosphate as the plasticizer successfully dispersed the lead salt solids in the plasticizer phase and 94.8% of the system's original water content was decanted off.

A similar system employing a hydrocarbon type plasticizer having a specific gravity of 1.02 20/4, initial boiling point 30° C. when at 1 mm. and viscosity 100° F.—146 cs., 210° F.—6.9 cs., as the plasticizer resulted in a complete phase transfer and 91.8% of the water contained in the system decanted off.

System similar to the above failed to effect a phase transfer of the solids or to separate any of the aqueous medium when no surfactant was present.

It is evident from the foregoing description and examples that basic lead salts may be transferred from an aqueous phase to an organic vehicle phase in the presence of aliphatic acid surfactants having 6 to 22 carbon atoms. The pastes produced are stable for extended periods of time, some having remained on the shelf as long as two years without apparent change.

While the compositions produced according to this invention are particularly useful as stabilizing and plasticizing agents for resinous compositions, many of them are useful for other purposes also. Thus, flushed pastes of white lead and dibasic lead stearate in mineral oil form excellent lubricating compositions.

The foregoing description and detailed examples of the invention are for the purposes of illustration and no undue limitation should be deduced therefrom.

This application is a continuation-in-part of our co-pending application for "Process for the Manufacture of Heat Stabilizing and Plasticizing Paste Compositions," Serial No. 529,919, filed on August 22, 1955, now abandoned.

We claim:

1. A process for preparing a flushed paste having heat stabilizing and plasticizing properties for resinous compositions which comprises agitating an aqueous filter cake of a basic lead salt with a liquid water-immiscible organic plasticizer in the presence of about 0.5% to about 5% by weight, based on the weight of said plasticizer, or a saturated fatty acid having from 6 to 22 carbon atoms, thereby dispersing said basic lead salt in said organic plasticizer while avoiding any substantial saponification of said plasticizer with said basic lead salt, and separating the water portion of said aqueous filter cake from said organic plasticizer and said lead salt therein dispersed.

2. A process according to claim 1 wherein said fatty acid contains from 6 to 16 carbon atoms.

3. A process for preparing a flushed paste having heat stabilizing and plasticizing properties for resinous compositions which comprises agitating an aqueous filter cake of dibasic lead phosphite with a water-immiscible plasticizer selected from the class consisting of esters and polyesters of phthalic acid in the presence of about 0.5% to 5% by weight of the plasticizer of a saturated fatty acid having 6 to 22 carbon atoms, thereby dispersing said dibasic lead phosphite in said plasticizer while avoiding any substantial saponification of said plasticizer with said basic lead phosphite, and separating the water portion of said aqueous filter cake from said plasticizer and said dibasic lead phosphite therein dispersed.

4. A process for preparing a flushed paste having heat stabilizing and plasticizing properties for resinous compositions which comprises agitating an aqueous filter cake of tribasic lead sulfate with a water-immiscible plasticizer selected from the class consisting of esters and polyesters of phthalic acid in the presence of about 0.5% to 5% by weight of the plasticizer of a saturated fatty acid having 6 to 22 carbon atoms, thereby dispersing said tribasic lead sulfate in said plasticizer while avoiding any substantial saponification of said plasticizer with said tribasic lead sulfate, and separating the water portion of said aqueous filter cake from said plasticizer and said tribasic lead sulfate therein dispersed.

5. A process for preparing a flushed paste having heat stabilizing and plasticizing properties for resinous compositions which comprises agitating an aqueous filter cake of dibasic lead phthalate with a water-immiscible plasticizer selected from the class consisting of esters and polyesters of phthalic acid in the presence of about 0.5% to 5% by weight of the plasticizer of a saturated fatty acid having 6 to 22 carbon atoms, thereby dispersing said dibasic lead phthalate in said plasticizer while avoiding any substantial saponification of said plasticizer with said dibasic lead phthalate, and separating the water portion of said aqueous filter cake from said plasticizer and said dibasic lead phthalate therein dispersed.

References Cited in the file of this patent

UNITED STATES PATENTS

| | | |
|---|---|---|
| 1,986,029 | Todd et al. | Jan. 1, 1935 |
| 2,283,519 | Waldie | May 19, 1942 |

FOREIGN PATENTS

| | | |
|---|---|---|
| 321,477 | Canada | Apr. 12, 1932 |